(12) United States Patent
Huff

(10) Patent No.: US 7,178,496 B2
(45) Date of Patent: Feb. 20, 2007

(54) INTAKE MANIFOLD FOR AN ENGINE AND METHOD OF CONTROLLING INTAKE AIR FLOW

(75) Inventor: Dan Huff, Portage, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 29 days.

(21) Appl. No.: 11/065,481

(22) Filed: Feb. 25, 2005

(65) Prior Publication Data

US 2005/0188940 A1 Sep. 1, 2005

Related U.S. Application Data

(60) Provisional application No. 60/548,095, filed on Feb. 27, 2004.

(51) Int. Cl.
*F02M 35/10* (2006.01)

(52) U.S. Cl. .................................. 123/184.42

(58) Field of Classification Search ........... 123/184.36, 123/184.49, 184.55, 184.53, 184.35, 184.37
See application file for complete search history.

(56) References Cited

U.S. PATENT DOCUMENTS 5,048,471 A 9/1991 Takii et al.
5,546,900 A 8/1996 Adamek et al.
6,295,960 B1 * 10/2001 Millner .................. 123/184.59

FOREIGN PATENT DOCUMENTS

JP 2002276380 A * 9/2002

* cited by examiner

*Primary Examiner*—Stephen K. Cronin
*Assistant Examiner*—Hyder Ali
(74) *Attorney, Agent, or Firm*—Crowell & Moring LLP

(57) ABSTRACT

An intake manifold with variable intake tract configurations for an internal combustion engine is provided, wherein pairs of long and short intake runners are located between inlet plenum chambers and respective manifold outlets, and a rotary valve located between a manifold wall and a row of short intake runners is selectively movable between a first position isolating the short runners from the intake air and isolating the inlet plenum chambers from one another, a second position isolating the short runners from the intake air while permitting communication between the plenum chambers, and a third position permitting the short runners to draw air directly from the plenum chambers. The resulting manifold provides a space- and cost-efficient mechanism for providing variable intake tract configurations, and eases accommodation of other design requirements in the design of the manifold.

8 Claims, 3 Drawing Sheets

INTAKE MANIFOLD FOR AN ENGINE AND METHOD OF CONTROLLING INTAKE AIR FLOW

CROSS REFERENCE TO RELATED APPLICATION

This application claims the priority benefit of the filing date of U.S. Provisional Patent Application No. 60/548,095, filed Feb. 27, 2004, the entire disclosure of which is incorporated herein by reference.

BACKGROUND AND SUMMARY OF THE INVENTION

The present invention relates to air intake manifolds for internal combustion engines, and in particular to an active intake manifold providing variable-length intake tracts between a throttle and an engine cylinder's intake port.

In past engine design practice, intake manifolds typically were designed with a fixed intake tract length (i.e., the length between an intake throttle and an engine cylinder's intake port) and intake tract shape, which were selected to optimize engine power output within a desired engine speed range. For example, at lower engine speeds, longer intake tracts are known to provide greater engine power output than obtained with shorter intake tracts, while shorter intake tracts are better suited to optimizing power output at high engine speeds. These differences are attributable to changes in the frequency and magnitude of intake back-pressure pulses generated by the opening and closing of the engine's intake valves at different engine speeds. As a result, designing an intake manifold typically involved compromise, because an intake manifold configuration selected to obtain optimum power output in one engine speed range would provide less-than-optimum power output in other engine speed ranges.

As internal combustion engine designs have advanced, designers have sought to minimize the inherent compromises in fixed-length intake manifold designs in order to increase available engine power output over a broader range of engine speeds. One approach has been to provide an intake manifold with two sets of intake tracts of different length feeding air to the engine cylinders' intake ports, along with a means of switching intake air flow between the sets of intake tracts when in different engine speed ranges. For example, a manifold may be provided with a set of short intake runners and a set of long intake runners, with the short intake runners blocked off by butterfly valves when at low engine speeds. When a predetermined engine speed (e.g., 4,000 rpm) is exceeded, the butterfly valves are opened to allow intake air to pass through the short intake runners into the cylinders to increase power output.

Implementation of a variable-runner manifold concept is not without its problems. In addition to accommodating multiple runner sets and runner actuators, variable runner manifolds must also meet a number of other design requirements, including providing mounting locations for appended devices such as exhaust gas recirculation ("EGR") and positive crankcase ventilation ("PCV") fittings, providing locations for fasteners to hold the manifold to the engine as well as access for installation or removal of the fasteners, accommodating irregular mounting flange shapes, being capable of being produced at reasonable cost, meeting acoustic requirements including government sound level limits, while providing driver-pleasing intake flow sounds. Compliance with the myriad design requirements represents a challenge to efficient packaging, production and installation of variable runner intake manifolds.

In view of the foregoing, it is an object of the present invention to provide an improved air intake manifold for an internal combustion engine. The present invention addresses the foregoing problems by providing a variable intake tract manifold which minimizes the space required for the intake tract-altering apparatus, thereby allowing designers greater freedom in arranging the manifold to accommodate the above design requirements, and provides these benefits with mechanically simple, reliable, easy to manufacture and cost efficient components.

In one embodiment of the present invention, there is provided an air intake manifold for an internal combustion engine with an air inlet port, two plenum chambers receiving air from the inlet port, a pair of long and short intake runners receiving air from the plenums for each engine cylinder and leading to a manifold outlet port, and a cylindrical rotary air flow control valve and valve actuator. One-half of the long runners draw air primarily from one plenum, with the remaining long runners drawing air primarily from the other plenum. The short runners draw air from both plenums. The cylindrical rotary valve controls air flow into the short runners and between the plenum chambers. The rotary valve is positioned over the inlet ends of the short runners and between the plenum chambers, such that as the rotary valve is rotated, it moves between a first position blocking air flow into the short runners and blocking air flow between the plenum chambers, a second position blocking air flow into the short runners and permitting the long runners to receive air from both plenum chambers, and a third position permitting all the runners to receive air flow from both plenum chambers.

The present invention thus provides a compact variable-tract intake manifold with at least three different intake tract configurations while significantly minimizing the space required by the variable-intake tract actuator, thereby allowing the intake manifold arrangements to be optimized to meet other design requirements while minimizing production costs.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
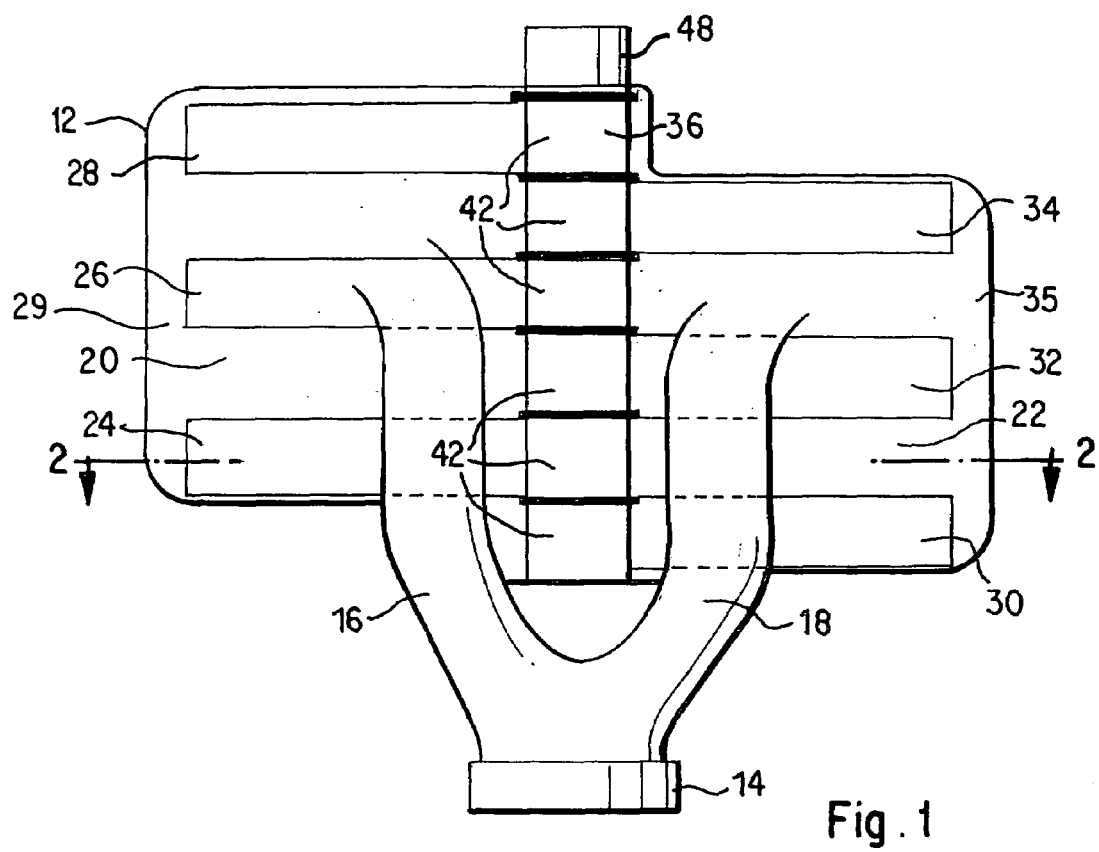
FIG. 1 is an cross-section view from above of an intake manifold in accordance with an embodiment of the present invention.

FIG. 1 is a cross-section view of an air intake manifold 10 in accordance with an embodiment of the present invention. The manifold 10 comprises a manifold body 12. Air entering the manifold body 12 through manifold inlet port 14 passes through passages 16, 18 into plenum chambers 20, 22. In this embodiment, manifold 10 is configured to direct air into the intake ports of a six-cylinder engine.

Also shown in FIG. 1 are long intake runners 24, 26 and 28 disposed within manifold body 12. The respective inlet ends of long runners 24, 26 and 28 face an outer peripheral region 29 of plenum chamber 20, and their outlet ends lead to respective manifold outlets at the center bottom of the manifold body (out of view in FIG. 1 under rotary valve 36). Similarly, the inlet ends of long runners 30, 32 and 34 are disposed in the outer peripheral region 35 of plenum chamber 22, and have their outlet ends at respective manifold outlets at the center bottom of the manifold body.

Figure 2:
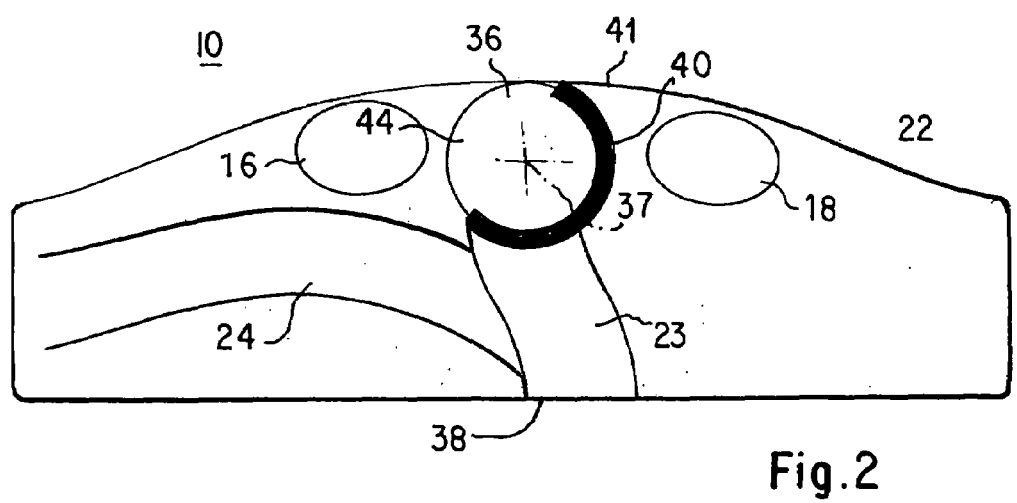
FIG. 2 is a vertical cross-section through section A—A of the embodiment of the present invention illustrated in FIG. 1 in which the rotary valve is in a first air flow control position.
Figure 5:
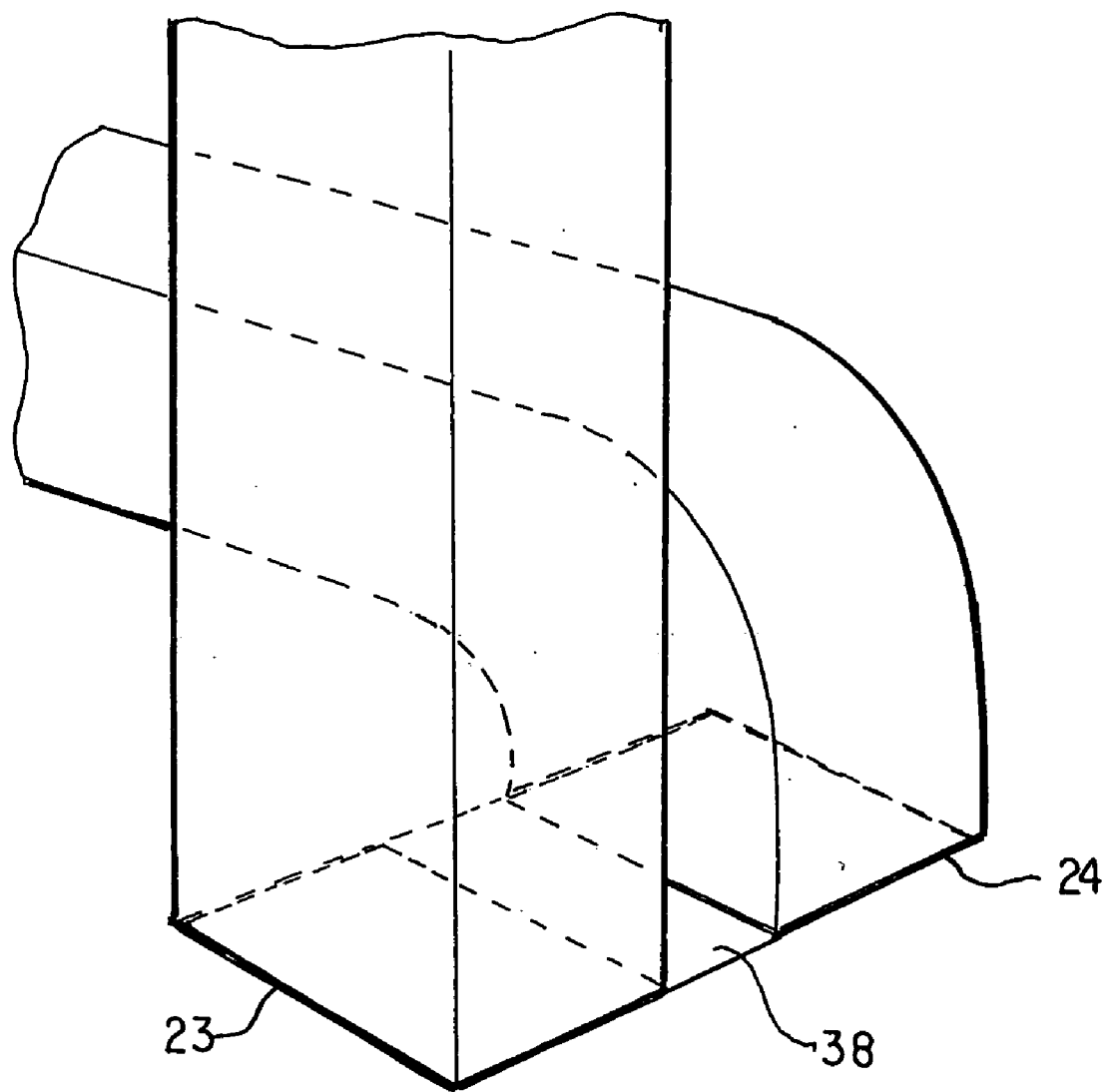
FIG. 5 is a perspective view of the meeting at a manifold outlet port of the long and short runners shown in FIGS. 2–4.

Referring to FIG. 2, a cross-section view of manifold 10 through line A—A on FIG. 1, there is shown beneath rotary valve 36 a short runner 23 extending between the rotary valve and a manifold outlet port 38. Short runner 23 at its outlet end meets the outlet end of long runner 24, and together runners 23, 24 communicate with manifold outlet port 38. Manifold outlet 38 leads to an intake port of one of the engine's cylinders (not shown). The meeting of the short runner 23 and long runner 24 at manifold outlet port 38 is further illustrated in perspective view in FIG. 5. For each of the long runners not shown in FIG. 2, there is a corresponding short runner under rotary valve 36 which shares a manifold outlet with the long runner.

Rotary valve 36 is generally cylindrical in shape, with its longitudinal axis 37 aligned above the manifold's outlet ports. The diameter of the rotary valve is sized to fit between the upper surface 41 of the manifold and the top of short runner 23. Rotary valve 36 is illustrated in FIG. 2 in a first position in which an air block wall 40, formed in the portion of rotary valve 36 above short runner 23, simultaneously closes off the inlet end of short runner 23 and isolates plenum chamber 20 from plenum chamber 22. In each region of the rotary valve above a short runner (regions 42 in FIG. 1), an air dam wall similar to wall 40 is formed. The portion 44 of rotary valve 36 not enclosed by a wall 40 in each region 42 is cut away or otherwise left hollow during manufacture. As a result, when rotary valve 36 is rotated away from the above-described first position, the hollow areas 44 form cross-passages which permit air flow across rotary valve 36 between the plenum chambers and/or into the short runners.

Referring now to the runners shown in FIG. 2, when rotary valve 36 is in the first position, air entering the plenum chamber 20 is drawn from region 29 into long runner 24 and passes therethrough to manifold outlet 38. Similarly, air also is drawn from region 29 into long runners 26 and 28, and air in plenum chamber 22 is being drawn into long runners 30, 32 and 34. Because rotary valve 36 is blocking movement of air into short runner 23 and between the plenum chambers, each engine cylinder is provided with a first intake tract length and shape comprising a long runner and a single plenum chamber. This configuration provides an optimum intake tract configuration for a first range of engine speeds.

Figure 3:
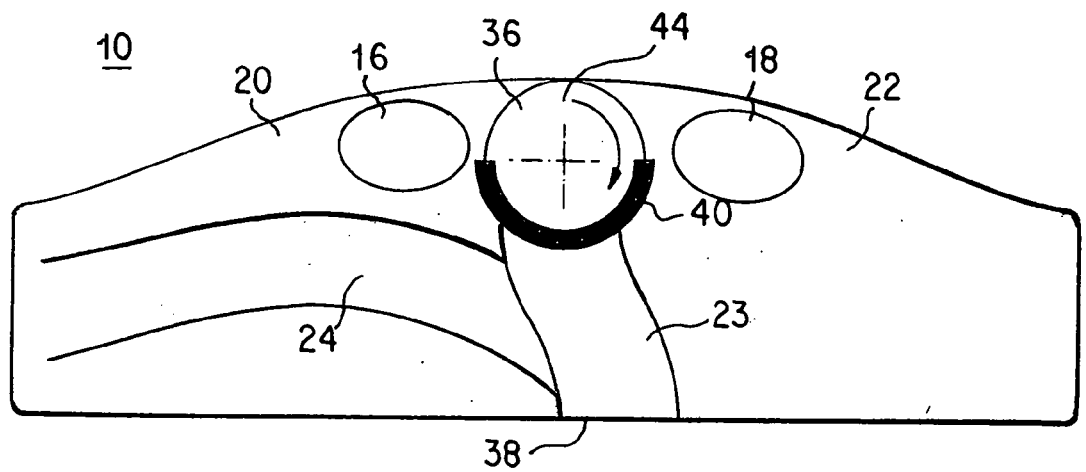
FIG. 3 is a vertical cross-section through section A—A of the embodiment of the present invention illustrated in FIG. 1 in which the rotary valve is in a second air flow control position.

As engine speeds change, rotary valve 36 may be rotated by its rotary valve actuator 48 (FIG. 1) in response to commands from an electronic engine control system (not illustrated), from the first position shown in FIG. 2 to a second position shown in FIG. 3. In this second position, the intake tract is changed to a configuration which optimizes intake air flow (and hence, engine power) in a different engine speed range than the speed range corresponding to the first rotary valve position. Specifically, when rotary valve 36 is rotated to the position shown in FIG. 3, air block wall 40 continues to close off the short runners from the plenum chambers, but now plenum chambers 20, 22 are permitted to communicate with one another across the open hollow portions 44 in each rotary valve region 42. Accordingly, each engine cylinder is provided with an intake tract comprising a long runner communicating with a plenum chamber, which in turn is in communication with the other plenum chamber. The addition of a second plenum chamber to each intake tract alters the resonant volume and shape of each intake tract, thereby providing an intake tract configuration optimized for a second engine speed range.

Figure 4:
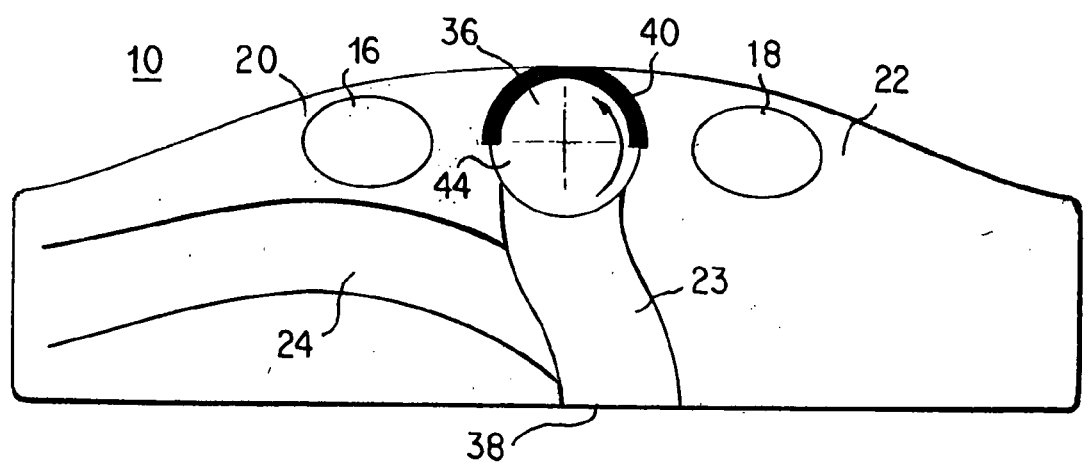
FIG. 4 is a vertical cross-section through section A—A of the embodiment of the present invention illustrated in FIG. 1 in which the rotary valve is in a third air flow control position.

In the present embodiment, rotary valve 36 may be further rotated by actuator 48 to a third position as illustrated in FIG. 4. In this position, air block wall 40 is now clear of the short runners, such that air from either plenum chamber 20, 22 may cross portion 44 and enter short intake runner 23 (as well as into the short runners under each of the remaining rotary valve region 42). Each engine cylinder thus is provided with a much shorter intake tract length, which is optimized to a third, higher engine speed range.

The foregoing embodiment provides an improved variable intake tract manifold, wherein the tract-switching mechanism is mechanically simple, cost effective and has minimal space requirements. As a result, designers are freed to optimize other aspects of the manifold design, such as meeting noise regulation limits and better accommodating placement of necessary features such as mounting fasteners and emissions control devices.

A variety of alternative embodiments of the present invention may be readily envisioned. For example, the rotary valve may comprise an air block wall 40 formed as a single curved blade along the entire length of the line of short runners and supported at its ends by cylindrical end sections. Alternatively, the rotary valve may be supported by the manifold body at intervals along its length, for example, by saddles cast into the manifold body which correspond to bearing surfaces between adjacent short runners. Such a configuration would further support the addition of circumferential sealing rings (such as the conventional elastomer o-rings 46 shown in FIG. 1) to further enhance plenum-to-plenum and plenum-to-short runner isolation. In other embodiments, each pair of long and short runners may serve more than one cylinder intake port. Similarly, alternative rotary valve arrangements may comprise more than one rotary valve controlling air flow into more than one row of short runners and between more than two plenum chambers.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An intake manifold for conducting air into an engine, comprising:
   a manifold body, including:
      a manifold inlet,
      a plurality of manifold outlets,
      a plurality of plenum chambers which receives air entering the manifold inlet, and at least two runners for each manifold outlet, wherein each runner conveys air from at least one plenum chamber to its respective manifold outlet and at least one of the at least two runners has a shorter length than another of the at least two runners;

a rotary valve disposed in the manifold body between at least two plenum chambers and between an inlet end of each of the short runners and a wall of the manifold body, said rotary valve controlling air flow between plenum chambers and controlling air flow from the plenum chambers into each of the short runners; and a rotary valve actuator, wherein the rotary valve actuator actuates the rotary valve between at least three positions, including a first position which prevents air flow into the short runners and prevents air flow between at least two plenum chambers, a second position which prevents air flow into the short runners and permits air flow between at least two plenum chambers, and a third position which permits air flow into the short runners and permits air flow between at least two plenum chambers.

2. The intake manifold of claim 1, wherein the rotary valve actuator actuates the rotary valve in response to commands from an engine control system.

3. The intake manifold of claim 2, wherein the engine control system commands rotary valve actuation in accordance with predetermined engine operating states.

4. The intake manifold of claim 3, wherein the predetermined engine operating states include engine operation in different engine speed ranges.

5. The intake manifold of claim 1, wherein the short runners are disposed in a line, and the rotary valve comprises a cylindrical valve member.

6. An intake manifold for conducting air into an engine, comprising:

a manifold body, including:
  at least one manifold inlet,
  at least two manifold outlets,
  at least two plenum chambers communicating with the at least one manifold inlet, and
  for each manifold outlet, a set of two runners through which at least one plenum chamber is in communication with at least one outlet, wherein
    each of the sets of two runners includes one runner which has a shorter length than other runner,
    the long runner of a first runner set communicates at a plenum end with a first plenum chamber and at an outlet end with a first manifold outlet, and the long runner of a second runner set communicates at a plenum end with a second plenum chamber and at an outlet end with a second manifold outlet, and
    the short runner of the first runner set communicates at an outlet end with the first manifold outlet, and the short runner of the second runner set communicates at an outlet end with the second manifold outlet;

a rotary valve disposed in the manifold body between the at least two plenum chambers and between the inlet end of each of the short runners and a wall of the manifold body; and a rotary valve actuator, wherein the rotary valve actuator actuates the rotary valve to rotate between at least three positions, the at least three positions including a first position which prevents air flow into the short runners and prevents air flow between the plenum chambers, a second position which prevents air flow into the short runners and permits air flow between the plenum chambers, and a third position which permits air flow into the short runners and permits air flow between the plenum chambers.

7. The intake manifold of claim 6, wherein the rotary valve actuator actuates the rotary valve in response to commands from an engine control system, and the engine control system commands rotary valve actuation in accordance with predetermined engine operating states, the predetermined engine operating states including engine operation in different engine speed ranges.

8. A method of controlling airflow into an engine with an intake manifold, comprising the steps of:

providing an intake manifold upstream of a plurality of cylinders of the engine, the intake manifold comprising
  a manifold body, including:
    a manifold inlet,
    a plurality of manifold outlets,
    a plurality of plenum chambers which receive air entering the manifold inlet, and
    at least two runners for each manifold outlet, wherein each runner conveys air from at least one plenum chamber to its respective manifold outlet and at least one of the at least two runners has a shorter length than another of the at least two runners; and
  a valve disposed in the manifold body which controls air flow from the plenum chambers into the short runners and air flow between plenum chambers;

determining engine operating conditions;

actuating the valve, based on the engine operating conditions, to one of at least three intake tract configuration positions, wherein the at least three positions include a first position which prevents air flow into the short runners and prevents air flow between the plenum chambers, a second position which prevents air flow into the short runners and permits air flow between the plenum chambers, and a third position which permits air flow into the short runners and permits air flow between the plenum chambers.

* * * * *